US 8,899,954 B2

(12) United States Patent
Ito et al.

(10) Patent No.: US 8,899,954 B2
(45) Date of Patent: Dec. 2, 2014

(54) CROSSHEAD (75) Inventors: Yuji Ito, Kanagawa (JP); Ryuichi Kawachi, Kanagawa (JP); Naoto Saito, Kanagawa (JP); Yukio Fujiwara, Kanagawa (JP); Satoru Araya, Tochigi (JP); Kazuhiro Ohtaki, Tochigi (JP); Masahiro Niihori, Tochigi (JP); Takatoshi Watanabe, Tochigi (JP); Naoya Tabuchi, Tochigi (JP); Wataru Iwase, Tochigi (JP)

(73) Assignees: The Japan Steel Works, Ltd., Tokyo (JP); Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 14/119,551

(22) PCT Filed: Jan. 10, 2012

(86) PCT No.: PCT/JP2012/050255
§ 371 (c)(1),
(2), (4) Date: Dec. 23, 2013

(87) PCT Pub. No.: WO2012/160835
PCT Pub. Date: Nov. 29, 2012

(65) Prior Publication Data
US 2014/0113016 A1 Apr. 24, 2014

(30) Foreign Application Priority Data
May 23, 2011 (JP) .................. 2011-114591

(51) Int. Cl.
*B29C 47/00* (2006.01)
*B29C 49/04* (2006.01)
*B29C 49/42* (2006.01)
*B29C 47/14* (2006.01)
*B29C 47/22* (2006.01)
*B29L 31/00* (2006.01)
*B29C 47/28* (2006.01)

(52) U.S. Cl.
CPC ............. *B29C 47/0066* (2013.01); *B29C 49/04* (2013.01); *B29C 49/4252* (2013.01); *B29C 49/42* (2013.01); *B29C 47/14* (2013.01); *B29C 47/22* (2013.01); *B29L 2031/7172* (2013.01); *B29C 2793/0081* (2013.01); *B29C 47/0054* (2013.01); *B29C 47/28* (2013.01); *B29C 2793/0063* (2013.01)
USPC ............... 425/133.1; 425/145; 425/378.1; 425/382.4; 425/526; 425/532

(58) Field of Classification Search
CPC B29C 47/0023; B29C 47/061; B29C 47/056; B29C 47/86; B29C 47/266; B29C 47/28; B29C 47/25; B29C 47/0026; B29C 47/26; B29C 47/067
USPC ......... 425/133.1, 145, 378.1, 382.4, 526, 532
See application file for complete search history.

(56) References Cited

U.S. PATENT DOCUMENTS

| 4,047,868 | A | * | 9/1977 | Kudo et al. ................. 425/133.1 |
| 5,062,782 | A | * | 11/1991 | Tompkins et al. ............ 425/113 |
| 2006/0099290 | A1 | | 5/2006 | Rohde et al. |

FOREIGN PATENT DOCUMENTS

| JP | 4-2087 | 1/1992 |
| JP | 6-126817 | 5/1994 |

(Continued)

OTHER PUBLICATIONS

International Search Report issued Mar. 27, 2012 in International Application No. PCT/JP2012/050255.

*Primary Examiner* — Jacob Thomas Minskey
(74) *Attorney, Agent, or Firm* — Wenderoth, Lind & Ponack, LLP (57) ABSTRACT

In a crosshead, a pair of sheets (7) are formed by bisecting a parison (3) suspended from a resin flow passage (30) formed between a core (9) and a die (8) by causing a first dividing body (33) of a separator (5, 5a) provided on the core (9) or the die (8) to contact a second dividing body (40) provided on the core (9) or the die (8).

15 Claims, 5 Drawing Sheets

(56) References Cited

FOREIGN PATENT DOCUMENTS

| JP | 6-218792 | 8/1994 |
| JP | 7-156255 | 6/1995 |
| JP | 9-1640 | 1/1997 |
| JP | 4295213 | 7/2009 |

* cited by examiner

(FIRST PRIOR ART)

FIG. 5

(SECOND PRIOR ART)

FIG. 6

(THIRD PRIOR ART)

FIG. 7

CROSSHEAD

BACKGROUND OF THE INVENTION

1. Technical Field

The present invention relates to a crosshead, and more particularly to a novel improvement for forming a pair of sheets by bisecting a parison using a first dividing body of a pair of separators provided in a lower portion of a core or a die, and a second dividing body provided on the die or the core.

2. Description of the Related Art

In recent years, a plastic fuel tank for use in an automobile, for example, has been molded by forming a cut line or the like in a sheet-form resin or parison instead of a conventional cylindrical parison. In so doing, a space for mounting an insert-molded component in an interior of the tank is secured while realizing gas permeability and various functions.

Figure 4:
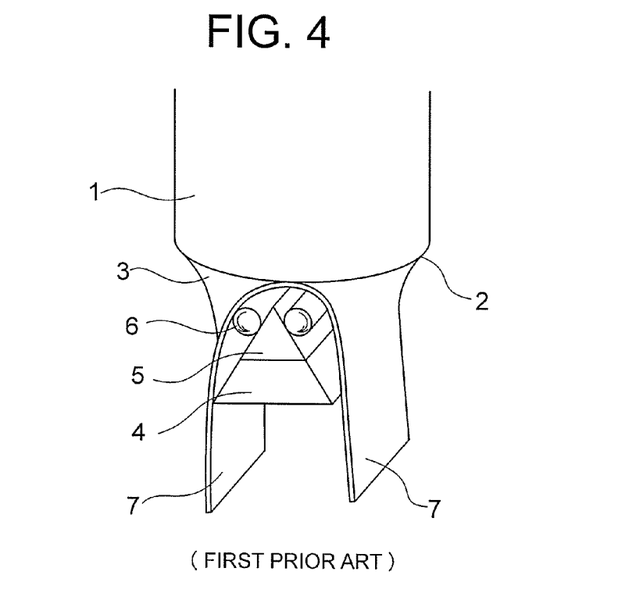
FIG. 4 is a perspective view showing a first conventional example.

A configuration described in Patent Document 1 serving as a first conventional example shown in FIG. 4, for example, may be cited as related art for obtaining a pair of sheets from a parison by forming a cut line in the parison.

In FIG. 4, a reference numeral 1 denotes an accumulator. A parison 3 discharged downward from an annular discharge port 2 formed in a lower portion of an extrusion apparatus 1 is bisected by a body 5, the body 5 being provided on a holder 4 positioned below the extrusion apparatus 1, so as to hang down via driven rolls 6 positioned on respective sides of the body 5. As a result, a pair of sheets 7 can be obtained from the parison 3.

Further, in a plastic sheet manufacturing apparatus described in Patent Document 2 serving as a second conventional example shown in FIG. 5, a parison 3 suspended from a die 8 of an extrusion apparatus 1 is cut by a cutter 5 positioned below the die 8 and then opened out into one sheet 7 via an opening member 9.

Figure 6:
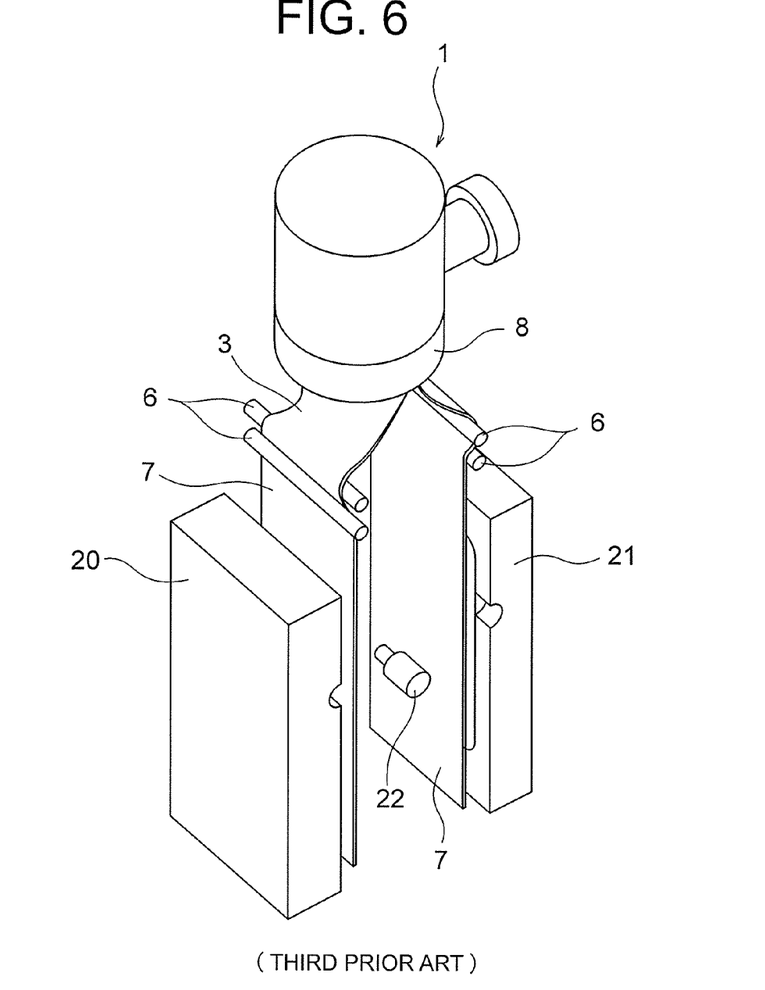
FIG. 6 is a perspective view showing a third conventional example.
Figure 7:
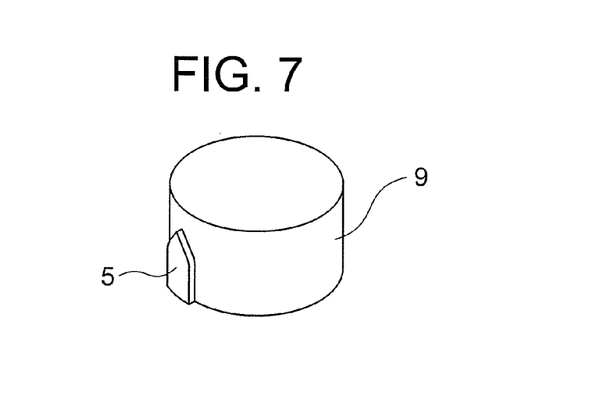
FIG. 7 is a perspective view showing a core of FIG. 6.

Furthermore, in a blow molding method described in Patent Document 3 serving as a third conventional example shown in FIGS. 6 and 7, a parison 3 discharged through a core 9 provided in a die 8 of an extrusion apparatus 1 is formed into a pair of divided sheets 7 by a flow passage restricting dividing member 5 of the core 9. The pair of sheets 7 hang down via driven rolls 6, and are insert-molded together with a component 22 between a pair of molds 20, 21.

Patent Document 1: Japanese Patent No. 4,295,213
Patent Document 2: Japanese Patent Application Publication No. H6-218792
Patent Document 3: Japanese Examined Patent Publication No. H4-2087

SUMMARY OF THE INVENTION

The conventional apparatuses for manufacturing sheets from a parison having the configurations described above exhibit the following problems.

In the configuration of Patent Document 1 shown in FIG. 4, the parison 3 is cut in two by the body 5, which is constituted by a blade, after being discharged from the extrusion apparatus 1 serving as a crosshead, and therefore gravity is used as a cutting force. However, friction generated in the body 5 serving as a cutting device causes resistance, and as a result, it may be impossible to realize favorable cutting.

The cutting must therefore be assisted by the pair of driven rolls 6.

Moreover, the body 5 must be cooled to ensure that the parison does not adhere to the body 5.

Furthermore, when a temperature of the parison 3 becomes too low as a result of cooling the body 5, the parison 3 must conversely be heated in order to be cut.

Figure 5:
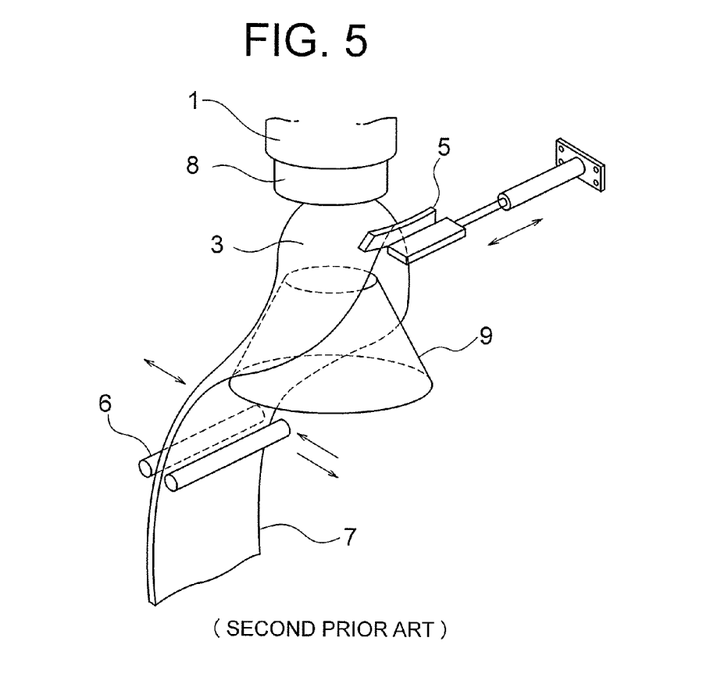
FIG. 5 is a perspective view showing a second conventional example.

Further, with the configuration of Patent Document 2 shown in FIG. 5, the sheets can be formed while continuously varying a vertical direction thickness thereof, but depending on a position and a condition of the cutting blade, cutting may be impossible. Moreover, the cutter 5 and the opening member 9 must be provided below the die 8, and therefore the parison 3 is cut after being discharged, causing similar problems to those of Patent Document 1 described above.

Furthermore, a structure for cutting the parison 3 is complicated, making it difficult to reduce an overall size of a blow molding device.

In the configuration of Patent Document 3 shown in FIGS. 6 and 7, the cutter 5 is formed to project from an outer periphery of the core 9, and therefore a thickness of the cutter 5 cannot be increased. The cutter 5 cannot therefore respond to variation in the thickness of the parison 3, and instead, various cores 9 must be exchanged.

An object of the present invention is to provide a crosshead capable of cutting a pair of sheets with stability using a first dividing body of a pair of separators provided in a lower portion of a core or a die and a second dividing body provided on the die or the core such that the second dividing body and the first dividing body slide against each other even when the core is moved vertically.

A crosshead according to the present invention includes: a core disposed in a die to be free to move vertically; an annular discharge port formed between the die and the core; and a pair of separators provided in a lower portion of the core or the die to form a parison discharged from the annular discharge port into bisected sheets, wherein a first dividing body provided on each of the separators is biased at all times toward a second dividing body, which is fixed to the die or core side, via a biasing body, and the first and second dividing bodies contact each other so as to be capable of sliding relative to each other in a vertical direction. Further, a radial direction width of the annular discharge port is varied by the vertical movement of the core, and the parison is cut by the separators even when a thickness of the parison is varied. Further, the parison is cut by the first dividing body and/or the second dividing body. Further, the separators are disposed so as to face each other in a diametrical direction of the core.

By configuring the crosshead according to the present invention as described above, following effects can be obtained.

By forming the crosshead from the core disposed in the die to be free to move vertically, the annular discharge port formed between the die and the core, and the pair of separators provided in the lower portion of the core or the die to form the parison discharged from the annular discharge port into bisected sheets, biasing the first dividing body provided on each of the separators toward the second dividing body, which is fixed to the die or core side, at all times via the biasing body, and causing the first and second dividing bodies to contact each other so as to be capable of sliding relative to each other in the vertical direction, the parison discharged from the annular discharge port of the crosshead can be cut by the pair of separators as is without decreasing in temperature, and as a result, a pair of favorably cut sheets can be obtained.

Further, even when the core moves vertically, the first dividing portion of the separators contacts and slides against the second dividing portion provided on the die or the core at all times, and therefore the parison can be cut regardless of variation in the thickness thereof.

Furthermore, the parison extruded from the lower portion of the crosshead is divided before being extruded rather than being cut with a cutting blade, and therefore molten resin can be formed into a sheet shape cleanly and with stability, without being affected by the condition and position of the cutting blade.

Further, the second dividing body is shaped to be capable of responding to a dimension by which the core moves in the vertical direction relative to the die, and therefore, by moving the core in the vertical direction relative to the die, a width dimension of the resin flow passage can be varied. As a result, molten resin can be formed into a sheet shape cleanly and with stability while continuously varying the resin thickness.

Moreover, by providing the second dividing body that is capable of responding to the dimension by which the core moves in the vertical direction relative to the die, the biasing body can be pressed against the first dividing body at a fixed pressing force without being stretched when the core is moved in the vertical direction relative to the die, and therefore molten resin can be formed into a sheet shape cleanly and with stability.

Further, the second dividing body is attached to a lower surface of the die or the core by an attachment plate of the second dividing body, while the first dividing body is attached to the interior of the core or the die, in which the recessed portion is engraved, by a tubular holder. Therefore, molten resin can be formed into a sheet shape cleanly and with stability using an existing device simply be replacing or restructuring the die and the core.

Furthermore, following replacement or restructuring, the second dividing body is retrofitted using the attachment plate, and therefore, by leaving the die or the core as is and replacing only the core or the die, the molten resin can be molded in two patterns, namely in parison form or sheet form.

DETAILED DESCRIPTION OF THE INVENTION

An object of the present invention is to provide a crosshead that forms a pair of sheets by bisecting a parison using a first dividing body of a pair of separators provided in a lower portion of a core or a die, and a second dividing body provided on the die or the core.

Embodiments

Preferred embodiments of a crosshead according to the present invention will be described below together with the drawings.

Note that identical reference symbols have been allocated to parts that are identical or equivalent to their counterparts in the conventional examples.

Figure 1:
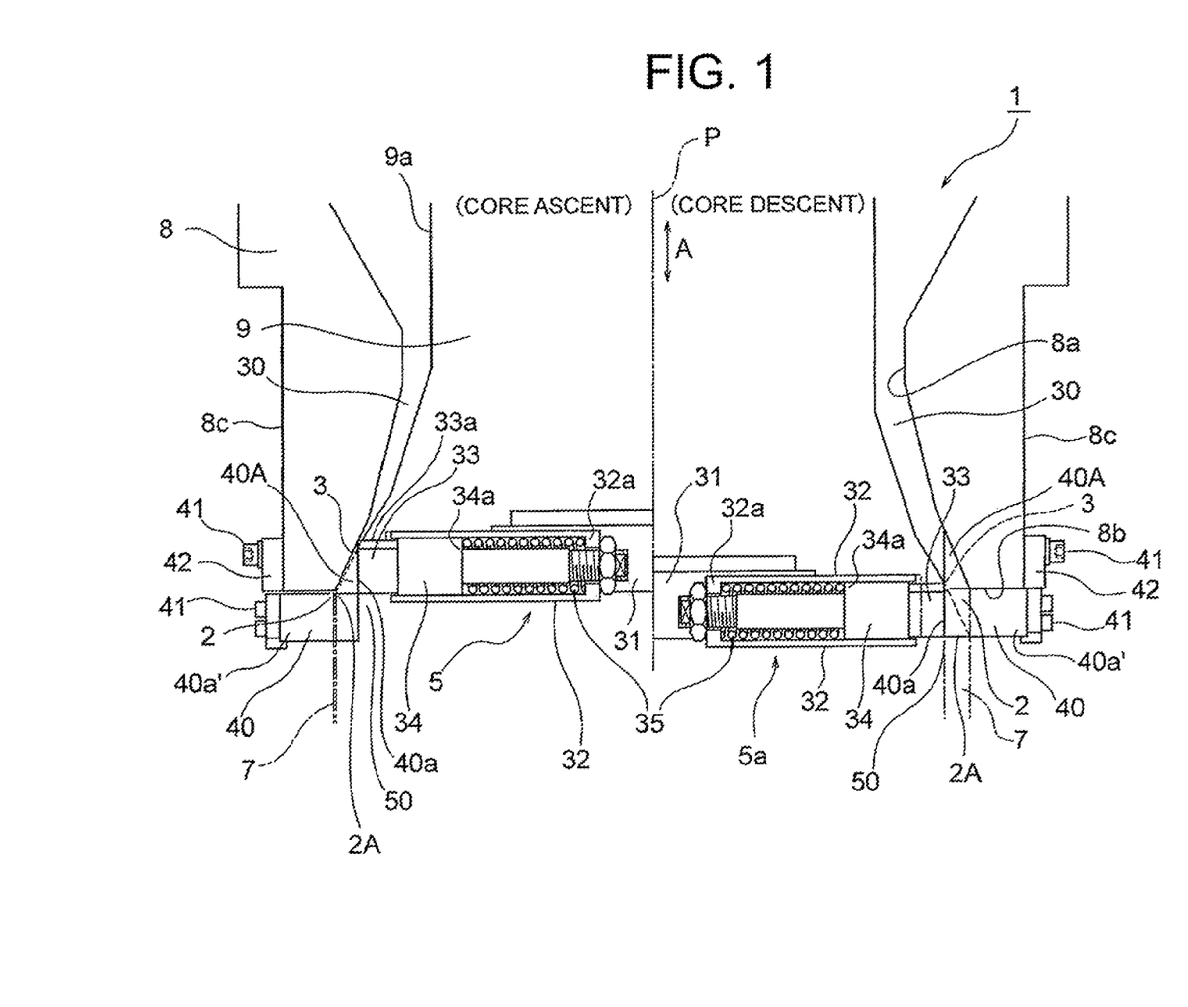
FIG. 1 is a sectional view showing core variation in a crosshead according to the present invention.
Figure 2:
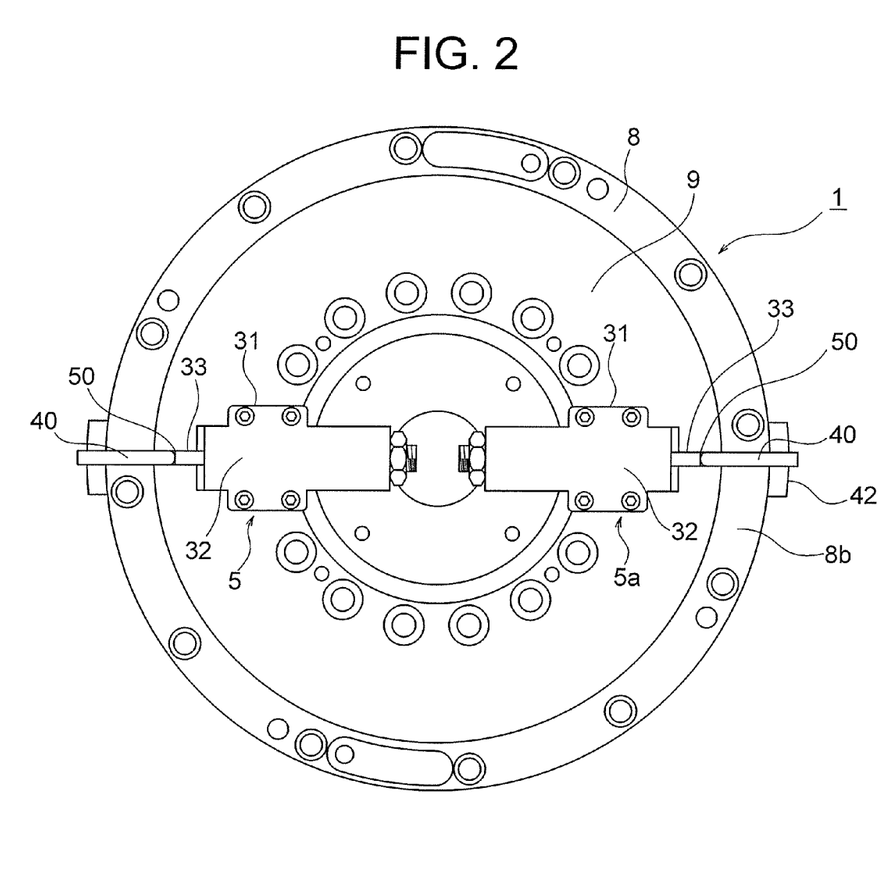
FIG. 2 is a front view of FIG. 1.

In FIGS. 1 and 2, a reference numeral 1 denotes a schematically illustrated crosshead configured such that a core 9 can move vertically in a direction of an arrow A via an actuator, not shown in the drawings, inside an annular die 8 of the crosshead 1. A left half of a center line P shows a case in which the core 9 has been raised to an uppermost position, and a right half shows a case in which the core 9 has been lowered to a lowermost position.

A resin flow passage 30 for discharging molten resin in a multilayered form or the like downward is formed in the crosshead 1 between an inner wall 8a of the die 8 and an outer wall 9a of the core 9, and an annular discharge port 2 for discharging a parison 3 is formed in a lower portion of the resin flow passage 30.

A radial direction width 2A of the annular discharge port 2 is varied continuously by the vertical movement of the core 9 such that in a region on the left side of the center line P in FIG. 1, where the core 9 is maximally raised, the radial direction width 2A is at a minimum, and in a region on the right side of the center line P in FIG. 1, where the core 9 is maximally lowered, the radial direction width 2A is at a maximum. Note that the radial direction width 2A is identical to a thickness of the discharged parison 3 and a sheet 3a.

A recessed portion 31 is formed in a lower portion of the core 9 to extend in a diametrical direction of the core 9, and a pair of separators 5, 5a are disposed in the recessed portion 31 so as to oppose each other in the diametrical direction.

The separators 5, 5a are respectively constituted by a tubular holder 32, an elongated separator body 34 having a first dividing body 33 on a tip end side thereof, and a biasing body 35 provided between a step portion 32a of the tubular holder 32 and a step portion 34a of the separator body 34 or the like. The first dividing body 33 is biased by a biasing force of the biasing body 35 so as to contact a vertical end surface 40a of a second dividing body 40, which is provided in a lower portion of the die 8 and includes a projection 40A, directly at all times, as indicated by a contact surface 50. Note that the contact surface 50 is formed to be rectilinear and vertical, including a part thereof corresponding to the projection 40A.

A coil spring, a rubber spring, a bellows-shaped body, a linear actuator, or the like positioned on an outer periphery of the separator body 34 may be used as the biasing body 35. As shown in FIG. 1, even when the thickness of the parison 3 is adjusted by moving the core 9 vertically, the first dividing body 33 slides against the second dividing body 40 of the die 8, and therefore the parison 3 can be bisected in the diametrical direction regardless of the thickness of the parison 3. Note that the respective dividing bodies 33, 40 are formed in a flat plate shape in order to cut the molten parison 3 inside the resin flow passage 30 before the parison 3 exits the annular discharge port 2 of the crosshead 1 downward (i.e. inside the crosshead 1).

The second dividing body 40 is disposed vertically on a lower surface 8b of the die 8. An outer end 40a' of each second dividing body 40 is held by an attachment plate 42 that is provided on an outer periphery 8c of the die 8 so as to be attached and detached freely using a plurality of bolts 41, while an upper surface 33a of each first dividing body 33 is tapered on both sides to be able to divide, or in other words cut, the parison 3 easily.

As shown in FIG. 1, when the core 9 is maximally raised, the first dividing body 33 rises while sliding against the vertical end surface 40a of the second dividing body 40 such that the parison 3 is cut by the respective dividing bodies 33, 40. When the core 9 is maximally lowered such that the first dividing body 33 is arranged in an identical horizontal position to the second dividing body 40, only the second dividing body 40 is positioned in the resin flow passage 30, and therefore the parison 3 is divided, or in other words cut, by the second dividing body 40 alone. As a result, the pair of sheets 3, 3*a* can be obtained.

Next, a case in which the pair of sheets 3*a*, 3*a* are obtained from the parison 3 using the crosshead 1 according to the present invention will be described.

First, when molten resin (single layer or multilayer) extruded from an extrusion device, not shown in the drawings, passes through the resin flow passage 30 so as to be discharged downward from the annular discharge port 2 as the parison 3, either the first dividing bodies 33 of the respective separators 5, 5*a*, the second dividing body 40 having the projection 40A, or both dividing bodies 33, 40 cut the parison 3 in the diametrical direction. Therefore, when the parison 3 is discharged from the lower portion of the crosshead 1, the pair of sheets 7 are formed.

Hence, the parison 3 is cut while the temperature thereof inside the crosshead 1, or in other words inside the resin flow passage 30, remains high, and therefore a cutting operation is performed extremely smoothly.

Further, the die 8 is configured to be capable of moving in a horizontal direction relative to the core 9, and by offsetting a sectional shape of the parison 3 such that a thickness balance is varied, the respective sheets 3, 3*a* can be formed in various shapes or thicknesses.

Since the parison 3 extruded from the lower portion of the crosshead 1 is divided by the respective dividing bodies 33, 34 before being extruded rather than being cut with a cutting blade, the molten resin can be formed into a sheet shape cleanly and with stability, without being affected by the condition and position of the cutting blade.

Furthermore, the second dividing body 40 moves, or in other words slides, in the vertical direction along the vertical contact surface 50 relative to the first dividing body 33 of the core 9 while remaining in contact therewith, and therefore, by moving the core 9 in the vertical direction relative to the die 8, a width dimension of the resin flow passage 30 can be varied. As a result, the molten resin can be formed into a sheet shape cleanly and with stability while continuously varying the resin thickness.

Moreover, by providing the second dividing body 40 that is capable of responding to the dimension by which the core 9 moves in the vertical direction relative to the die 8, the spring can be pressed against the first dividing body 33 at a fixed pressing force without being stretched when the core 9 is moved in the vertical direction relative to the die 8, and therefore the molten resin can be formed into a sheet shape cleanly and with stability.

Further, the second dividing body 40 is attached to the lower surface 8*b* of the die 8 by the attachment plate 42 of the second dividing body 40, while the first dividing body 33 is attached to the interior of the core 9, in which the recessed portion 31 is engraved, by the tubular holder 32. Therefore, the molten resin can be formed into a sheet shape cleanly and with stability using an existing device simply be replacing or restructuring the die 8 and the core 9.

Furthermore, following replacement or restructuring, the second dividing body 40 is retrofitted using the attachment plate 42, and therefore, by leaving the die 8 as is and replacing only the core 9, the molten resin can be molded in two patterns, namely in parison form or sheet form.

Figure 3:
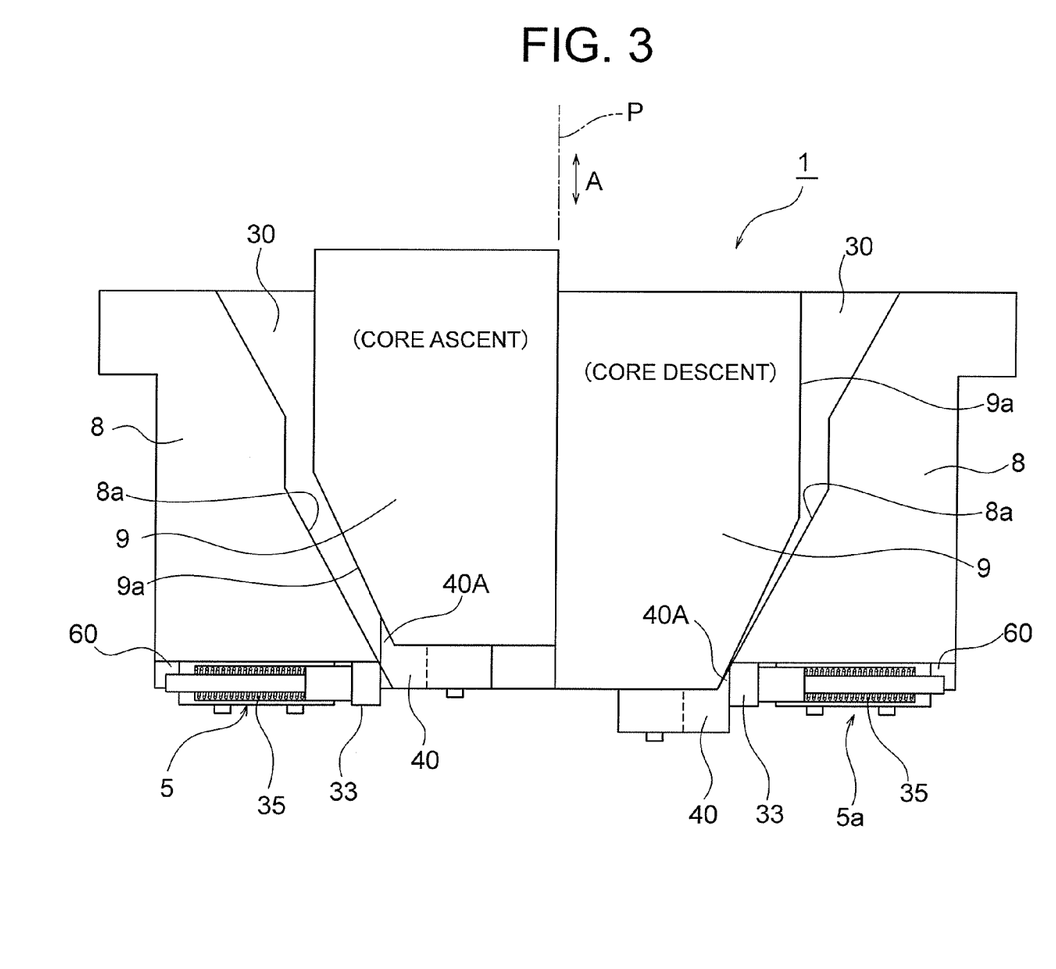
FIG. 3 is a sectional view showing another embodiment of FIG. 1.

Moreover, in the above embodiment, the separators 5, 5*a* for biasing the first dividing body 33 using the biasing body 35 are provided in the core 9, but in another embodiment, as shown in FIG. 3, similar actions and effects to those described above can be obtained by attaching the separators 5, 5*a* to the die 8 and attaching the second dividing body 40 to the lower portion of the core 9, with the result that the respective dividing bodies 33 and 40 slide relative to each other.

Further, when the respective separators 5, 5*a* are attached to the lower portion of the die 8, as described above, the recessed portion 60 is provided on and attached to the lower portion of the die 8, and the second dividing body 40 is provided in the recessed portion 31 in the lower portion of the core 9.

Furthermore, by providing a curved portion on the contact surface 50 between the first dividing body 33 and the second dividing body 40, the first and second dividing bodies 33, 40 can be prevented from shifting relative to each other.

Moreover, by providing the biasing body 35 in the tubular holder 32, forming a curved portion on the contact surface 50, and forming an elongated hole (not shown) in the attachment plate 42, the thickness of the parison 3 can be controlled by shifting the core 9 in an XY axis direction.

In the crosshead according to the present invention, a parison can be cut inside a crosshead using a first dividing body and a second dividing body, and separators can be retrofitted to both new and existing crossheads.

The invention claimed is:

1. A crosshead comprising:
   a core disposed in a die to be free to move vertically;
   an annular discharge port formed between the die and the core; and
   a pair of separators provided in a lower portion of the core or the die to form a parison discharged from the annular discharge port into bisected sheets,
   wherein a first dividing body of a separator body of each of the separators is biased at all times via a biasing body so as to contact a vertical end surface of a projection provided on a tip end side of a second dividing body, which is fixed to the die or the core side, directly at all times via a rectilinear, vertically formed contact surface,
   the first and second dividing bodies are configured to be capable of sliding relative to each other in a vertical direction while contacting each other on the contact surface,
   the separators are provided in a recessed portion in a lower portion of the core or a recessed portion in a lower portion of the die, and
   the parison is cut by the first dividing body and/or the second dividing body including the projection.

2. The crosshead according to claim 1, wherein the separators are disposed to face each other in a diametrical direction of the core.

3. The crosshead according to claim 1, wherein each of the biasing bodies is comprised of spring means disposed in a tubular holder of the respective separator.

4. A crosshead comprising:
   a die;
   a core disposed in the die so as to be movable relative to the die in a vertical direction, wherein the die and core are arranged so that a flow passage is formed between an outer peripheral surface of the core and an inner peripheral surface of the die, and an annular discharge port for discharging a parison is formed in a lower portion of the flow passage;
   a pair of separators provided in a recessed portion formed in a lower portion of the core, the separators extending in a diametrical direction of the core, wherein the separators are configured to form bisected sheets from the parison discharged from the annular discharge port; and
   a pair of second dividing bodies provided in a lower portion of the die so as to oppose the separators, respectively, wherein each of the separators comprises a tubular holder, an elongated separator body disposed in the tubular holder, and a biasing body provided between a step portion of the tubular holder and a step portion of the elongated separator body.

5. The crosshead according to claim 4, wherein each of the elongated separator bodies includes a first dividing body biased by the biasing body into contact with a contact surface of the opposing one of the second dividing bodies.

6. The crosshead according to claim 4, wherein each of the second dividing bodies includes a projection defining a vertical end contact surface.

7. The crosshead according to claim 4, wherein the opposing first and second dividing bodies are in constant sliding contact.

8. The crosshead according to claim 4, wherein the separators and the second dividing bodies are aligned in the diametrical direction of the core.

9. The crosshead according to claim 6, wherein each of the biasing bodies is comprised of a spring disposed in the tubular holder.

10. A crosshead comprising:

a die;

a core disposed in the die so as to be movable relative to the die in a vertical direction, wherein the die and core are arranged so that a flow passage is formed between an outer peripheral surface of the core and an inner peripheral surface of the die, and an annular discharge port for discharging a parison is formed in a lower portion of the flow passage;

a pair of separators attached to a lower portion of the die, the separators extending in a diametrical direction of the core, wherein the separators are configured to bisect the parison discharged from the annular discharge port in the diametrical direction of the core; and a pair of second dividing bodies attached to a lower portion of the core so as to oppose the separators, respectively, wherein each of the separators comprises a tubular holder, an elongated separator body disposed in the tubular holder, and a biasing body provided between a step portion of the tubular holder and a step portion of the elongated separator body.

11. The crosshead according to claim 10, wherein each of the elongated separator bodies includes a first dividing body biased by the biasing body into contact with a contact surface of an opposing one of the second dividing bodies.

12. The crosshead according to claim 10, wherein each of the second dividing bodies includes a projection defining a vertical end contact surface.

13. The crosshead according to claim 10, wherein the opposing first and second dividing bodies are in constant sliding contact.

14. The crosshead according to claim 10, wherein the separators and the second dividing bodies are aligned in the diametrical direction of the core.

15. The crosshead according to claim 10, wherein each of the biasing bodies is comprised of a spring disposed in the tubular holder.

* * * * *